United States Patent [19]

Van De Plassche et al.

[11] Patent Number: 5,889,822
[45] Date of Patent: Mar. 30, 1999

[54] SIGNAL PROCESSOR WITH REDUCED COMPLEXITY, AND RECEIVER COMPRISING SUCH A SIGNAL PROCESSOR

[75] Inventors: Rudy J. Van De Plassche; Gerardus C.M. Gielis, both of Eindhoven, Netherlands

[73] Assignee: U.S. Philips Corporation, New York, N.Y.

[21] Appl. No.: 704,200

[22] Filed: Aug. 28, 1996

[30] Foreign Application Priority Data

Aug. 30, 1995 [EP] European Pat. Off. .............. 95202342

[51] Int. Cl.[6] .......................... H04L 27/06; H04L 27/14; H04L 27/22
[52] U.S. Cl. ........................................... 375/316; 364/731
[58] Field of Search .................... 375/316, 340, 375/346; 364/730, 731

[56] References Cited

U.S. PATENT DOCUMENTS

| | | | |
|---|---|---|---|
| 3,939,330 | 2/1976 | Fluet | 364/730 |
| 3,976,869 | 8/1976 | Stella et al. | 364/730 |
| 4,843,584 | 6/1989 | Sundaramurthy | 364/735 |
| 4,896,287 | 1/1990 | O'Donnell et al. | 364/754 |
| 4,945,505 | 7/1990 | Weiner et al. | 364/715.03 |
| 5,230,011 | 7/1993 | Gielis et al. | 375/340 |
| 5,317,753 | 5/1994 | Kuenemund et al. | 395/800 |

FOREIGN PATENT DOCUMENTS

0486095A1  5/1992  European Pat. Off. .

OTHER PUBLICATIONS

"A 540–MHz 10–b Polar–to–Cartesian Converter", by Gerard C. Gielis et al, IEEE Journal of Solid State Circuits, vol. 26, No. 11, Nov. 1991, pp. 1645–1650.

"A unified algorithm for elementary functions", by J.S. Walather, Spring Joint Computer Conference, 1971, pp. 379–385.

Primary Examiner—Tesfaldet Bocure
Assistant Examiner—Bryan Webster
Attorney, Agent, or Firm—Edward W. Goodman

[57] ABSTRACT

A signal processor has an X-Y rotation circuit and a phase angle control circuit, in the phase angle control circuit, an input phase being approximated by a series of consecutive, in magnitude, decreasing phase angles for forming an output vector by rotation of an input vector over the approximation of the input phase. In the phase angle control circuit, an accuracy of the representation of a phase angle out of the series of phase angles, is dependent on the magnitude of the phase angle, thereby reducing the number of computations in the phase angle control circuit.

4 Claims, 4 Drawing Sheets

SIGNAL PROCESSOR WITH REDUCED COMPLEXITY, AND RECEIVER COMPRISING SUCH A SIGNAL PROCESSOR

BACKGROUND OF THE INVENTION

1. Field of the Invention

The invention relates to a signal processor comprising an X-Y rotation circuit for rotating, consecutively, an input vector over a series of, in magnitude, decreasing phase angles into an output vector, said X-Y rotation circuit comprising first and second inputs for receiving the input vector, and first and second outputs for supplying the output vector, and a phase angle control circuit for decomposing an input phase into a series of, in magnitude, decreasing phase angles, said phase angle control circuit comprising a phase input for applying an input phase thereto.

2. Description of the Related Art

The invention further relates to a receiver comprising such a signal processor. Such a signal processor is known from IEEE Journal of Solid-State Circuits, Vol. 26, No. 11, Nov. 1991, p. 1645–1650. In this article, a signal processor, in the form of a Coordinate Rotation Digital Computer, is described, wherein an input vector is applied to the first and second inputs of the X-Y rotation circuit and a phase signal is applied to the phase input of the phase angle control circuit. An output vector, supplied to the first and second outputs, is formed by rotation of the input vector over an angle, which is an approximation of the phase signal, said approximation taking place in the phase angle control circuit. Such a signal processor can, for example, be used as a polar-to-cartesian converter, by applying a ramp-shaped signal to the phase input, having a range of $2\pi$ radians. Now, the signal processor produces a cosine and a sine wave at the first and second outputs, respectively. In this way, the signal processor can be used as a mixing stage by applying a quadrature input signal to the first and second inputs.

A drawback of the known signal processor is that when a high frequency resolution is required, the phase signal needs to have a large word length, i.e., a large number of bits for representing the phase signal. This results in a large number of computations in the phase angle control circuit, resulting in a large and complex circuit.

SUMMARY OF THE INVENTION

An object of the present invention is to provide a signal processor, having reduced complexity without a significant decrease of the accuracy.

A signal processor according to the invention is characterized in that in said phase angle control circuit, each of the phase angles out of said series of, in magnitude, decreasing phase angles is represented with an accuracy, which is dependent on the magnitude of the phase angle.

The invention is based on the recognition that in the approximation of the phase signal by a series of, in magnitude, decreasing phase angles, a contribution of an error in the representation of each phase angle to a total error in the approximation of the phase signal, depends on the magnitude of said phase angle. Thus, an error in a small phase angle will have less effect on the total error than an error of similar magnitude in a larger phase angle. This allows a reduction of number of least significant bits—and thus a reduction of the word length—in the representation of the phase angles, said reduction increasing for, in magnitude, decreasing phase angles. By the increased reduction of the word length of consecutive, in magnitude, decreasing phase angles, no calculations need be performed for those bits in the representation which have been deleted. This reduces the number of calculations in the phase angle control circuit and, consequently, reduces the number of components required for realizing the signal processor.

By selecting the representation of the smallest phase angle to have an accuracy of, for example, 0.5 or 0.25 of its own value, a sufficiently accurate approximation of the input phase angle is achieved.

An embodiment of a signal processor according to the invention is characterized in that each of said phase angles is represented with an accuracy substantially proportional to its magnitude.

As a contribution of an error in the representation of a phase angle to the total error is substantially proportional to the magnitude of the phase angle, this measure leads to a kind of optimum, as now, an error of each of the phase angles will contribute equally to the total error.

BRIEF DESCRIPTION OF THE DRAWING

The above object and features of the present invention will be more apparent from the following description of the preferred embodiments with reference to the drawings, wherein.

DESCRIPTION OF THE PREFERRED EMBODIMENT

Figure 1:
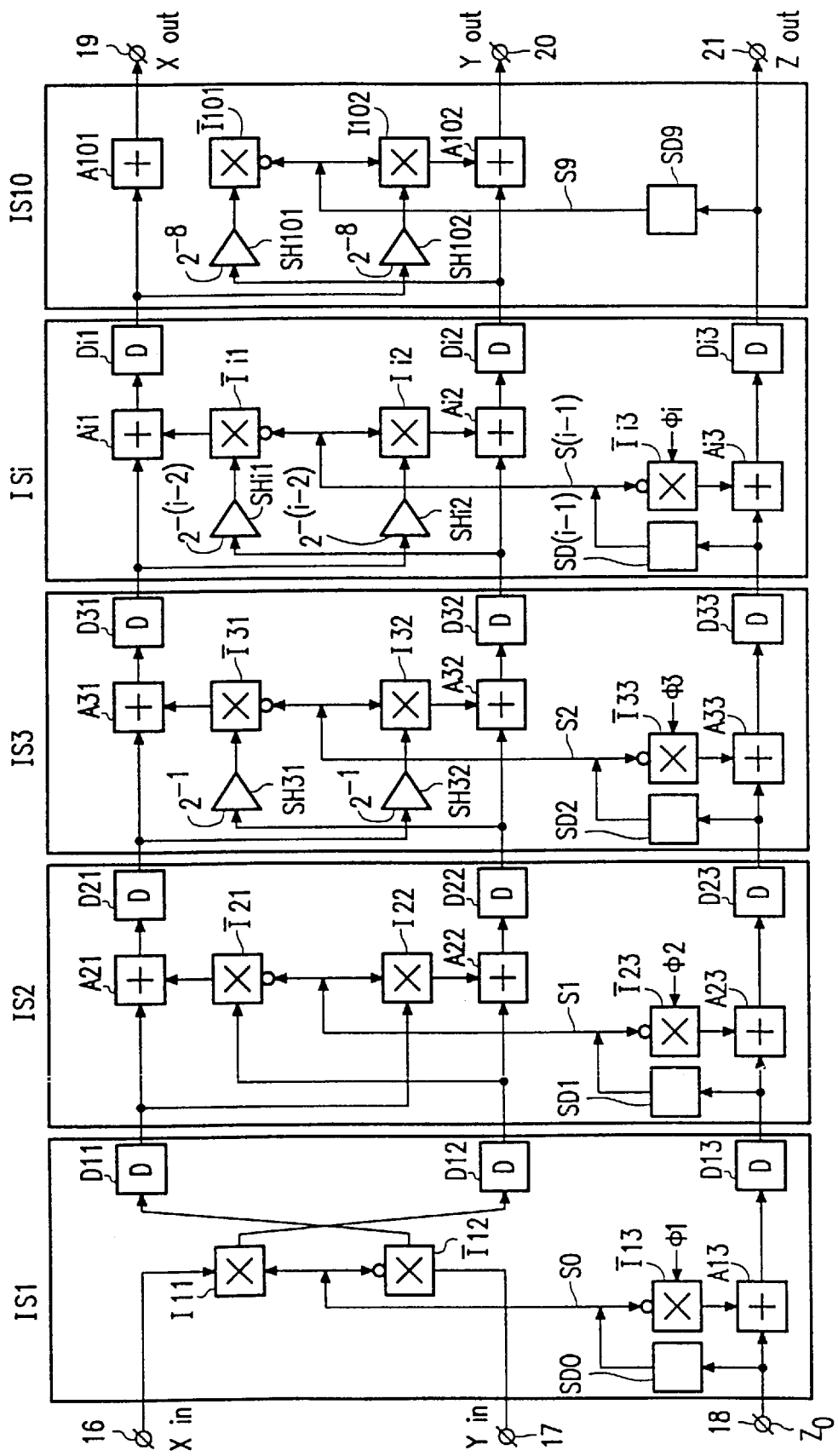
FIG. 1 shows a functional block diagram of the known signal processor.

FIG. 1 shows a functional block diagram of the signal processor 9. The operation of the signal processor 9 is known per se, for example, from the article "A unified algorithm for elementary functions" by J. S. Walther published in "Spring Joint Computer Conference, 1971", pp. 379 to 385. As is known from this article, a signal processor, in this case, a Coordinate Rotation Digital Computer or Cordic, computes the cartesian coordinates of a signal vector Xout and Yout obtained by rotating an input signal vector, formed by the input phase quadrature signals Xin and Yin at the first and second signal inputs 16 and 17 of the Cordic 9, through a phase angle Zo which is applied to the first phase signal input 18 of the Cordic 9. In this application of the signal processor, a fixed signal value is supplied to the phase signal output 21, which value is equal to 0 or, within a given tolerance deviation, is equal to 0 and which will hereinafter be briefly referred to as the zero value. This output signal namely represents the difference between the input phase Zo and its approximation.

In the version shown, this stage comprises a cascade circuit of ten iteration sections IS1 to IS10 in which one of ten consecutive iterative angle convergence steps is performed. As is known from the above-mentioned article by Walther, the associated changes in the signal values of the signal or signals applied to the signal input 16 and/or the signal input 17 are defined, for each iteration step in the sections IS2 to IS10, by the following equations:

$$X(j+2)=X(j+1)-\text{sign } Z(j+1)*2^{-j}*Y(j+1)$$

$$X(j+2)=Y(j+1)+\text{sign } Z(j+1)*2^{-j}*Y(j+1)$$

$$Z(j+2)=Z(j+1)-\text{sign } Z(j+1)* \text{ arc tan } 2^{-j}$$

with j=0 . . . 9 for a given choice of the angle convergence. For the section IS1, it holds that:

X1=−sign Zo * Yo

Y1=sign Zo * Xo

Z1=Zo−sign Zo * π/2 The references Xo and Yo denote the sampling values of Xin and Yin, respectively, and sign Zo denotes the sign of the sampling value Zo of z.

In a so-called z branch of the sections IS1 to IS10, which will hereinafter be described in greater detail, the input angle value Zo is rotated iteratively via a series of fixed converging angles (see Table 1) towards zero or at least towards a residual value deviating therefrom within the tolerance deviation. Together, the z branches of the sections IS1 to IS10 constitute a phase angle control circuit. For each iteration section, the sign, or the direction of the fixed rotation angle, is defined with which the desired angle convergence is obtained. In the first iteration section IS1, π/2 is added to Zo or subtracted from Zo in dependence on the sign of Zo, resulting in a new angle value Z1.

In the second iteration section IS2, π/4 is added to Z1 or subtracted from Z1 in dependence on the sign of Z1, resulting in Z2 such that Z2<Z1, etc.

The Table 1 below shows through which angles the input angle value Zo is successively rotated in the consecutive iteration sections. It is based on a 24-bit representation in so-called two's complement mode, in which $2^{24}$=16777216 corresponds to 2π.

inputs of I11 and Ī12 are connected to first and second signal inputs 16 and 17, respectively, of the signal processor 9, while a signal input of Ī13 is coupled to a fixed angle rotation value $\phi_1$ corresponding to an angle value of 90° as is indicated on the top line of the Table 1 above. A signal output of Ī13 is coupled to a first signal input of an adder A13, while a second signal input of A13 is coupled to the phase signal input 18. Signal outputs of I11, Ī12 and A13 are coupled to delay circuits D12, D11 and D13, respectively. These delays are not important for the function, but are only inserted for pipelining.

If the most significant bit in the angle value Zo at the phase signal input 18 is positive, the sign of the signal sample Yo of the signal input 17 is inverted in the inverter circuit Ī12, whereafter it is stored as a new signal sample X1 in the delay circuit D11, while the signal sample Xo at the first signal input 16 is stored in the delay circuit D12 as the new signal sample Y1 with the same sign. An opposite sign inversion is effected when the last-mentioned most significant bit in Zo is negative. The circuits SD0, Ī13 and A13 constitute the so-called z branch of the iteration section IS1. Not only the sign of the rotation step required for the afore-mentioned processing of the samples Xo and Yo, but also a signal processing corresponding to a rotation of the angle value Z1 through 90° towards the zero value, for example, 0, resulting in Z1=Zo±90° is obtained. By representing the angle value in a so-called two's complement form, it will be possible to simplify the circuits required for the angle convergence to a considerable extent and to reduce their size, as will hereinafter be explained in greater detail. The signal processing operations in the first iteration section IS1 described so far are effected in one sampling period, for example, ts1. In a subsequent sampling period ts2, corre-

TABLE 1

$\phi_i$ in different representation formats.

| φ | Radians | Decimals | +Binary | −Binary |
|---|---|---|---|---|
| 1 | 2*arctan($2^{-0}$) | 4194304 | 010000000000000000000000 | 110000000000000000000000 |
| 2 | arctan($2^{-0}$) | 2097152 | 001000000000000000000000 | 111000000000000000000000 |
| 3 | arctan($2^{-1}$) | 1238021 | 000100101110010000000101 | 111011010001101111111011 |
| 4 | arctan($2^{-2}$) | 654136 | 000010100000000000000000 | 111101100000000000000000 |
| 5 | arctan($2^{-3}$) | 332050 | 000001010010001100010010 | 111110101110111011101110 |
| 6 | arctan($2^{-4}$) | 166669 | 000000101000101100001101 | 111111010111010011110011 |
| 7 | arctan($2^{-5}$) | 83416 | 000000010100010111011000 | 111111101011101000101000 |
| 8 | arctan($2^{-6}$) | 41718 | 000000001010001011110110 | 111111110101110100001010 |
| 9 | arctan($2^{-7}$) | 20860 | 000000000101000101111100 | 111111111010111010000100 |

In the embodiment shown, it is checked, in the first iteration section IS1, whether the digital 24-bit angle value Zo has a positive or a negative sign. To this end, the first iteration section IS1 comprises a sign detector SD0 which is coupled to the phase signal input 18 and which detects the sign of the angle value Zo, i.e., starting from a two's complement representation, it defines the bit value of the most significant bit in the angle value Zo. The sign detector SD0 is coupled to control inputs of an inverter circuit I11, an inverter circuit Ī12 which is complementary thereto and an inverter circuit Ī13 which is also complementary. An inverter circuit is hereinafter understood to mean a circuit which multiplies an input signal by the control signal, i.e., it does not invert the input signal when the control signal is +1 and it inverts this signal when the control signal is −1, thus realizing an Exclusive-NOR function. A complementary inverter circuit works the other way round: signal inversion at a +1 control signal and no signal inversion at a −1 control signal, thus realizing an Exclusive-OR function. Signal sponding signal processing operations are performed, starting from the new sample values X1 and Y1 and the new angle value Z1.

In the second iteration section IS2, the most significant bit value of the angle word stored in D13 is detected in a sign detector SD1 in the last-mentioned sampling period ts2. An output of SD1 is connected to control inputs of an inverter circuit I22 and inverter circuits Ī21 and Ī23 which are complementary thereto. Signal inputs of I22 and Ī21 are connected to outputs of D11 and D12, respectively, while a signal input of Ī23 is connected to a fixed angle rotation value $\phi_2$ corresponding to an angle value of 4520 . Signal outputs of Ī21, I22 and Ī23 are connected to adder circuits A21, A22 and A23, respectively. First signal inputs of A21, A22 and A23 are connected to the signal outputs of D11, D12 and D13, respectively. Signal outputs of A21, A22 and A23 are coupled to delay circuits D21, D22 and D23, respectively.

Dependent on the sign or the value of the most significant bit in the angle value Z1, which is supplied from D13 to the z branch (SD1 and A23) of the second iteration section IS2, the signal of the X1 and Y1 signal samples supplied by D11 and D12, respectively, is inverted in the complementary circuit $\bar{I}21$, followed by additions in A21 and A22 with the original value of these signals. The results of these additions are stored as signal samples X2 and Y2 in the delay circuits D21 and D22, respectively. In the last-mentioned z branch, an angle iteration step is performed again with the aid of the complementary inverter circuit $\bar{I}23$ and the adder circuit A23, this time through an angle of $\pi/4$ in such a direction that the now new angle value Z2 at the output of A23 is smaller than Z1. This new angle value Z2 is subsequently stored in the delay circuit D23.

In a subsequent sampling period ts3, the contents of the delay circuits D21, D22 and D23 are applied as input signal sample for the third iteration section IS3, which has mainly the same circuit configuration as the second iteration section IS2. The third iteration section IS3 comprises a sign detector SD2, an input of which is coupled to an output of the delay circuit D23 and a signal output of which is coupled to control inputs of an inverter circuit I32, and inverter circuits $\bar{I}31$ and $\bar{I}33$ which are complementary thereto. Outputs of the delay circuits D21 and D22 are coupled to first signal inputs of adder circuits A31 and A32, respectively, and to signal inputs of I32 and $\bar{I}31$ via shift registers SH32 and SH31 functioning as divide-by-two circuits. Signal outputs of $\bar{I}31$ and I32 are coupled to second signal inputs of the adder circuits A31 and A32, respectively. Signal outputs of A31 and A32 are subsequently coupled to signal inputs of delay circuits D31 and D32, respectively. A fixed binary value, corresponding to an angle value $\phi_3$, is, applied to a signal input of the complementary inverter circuit $\bar{I}33$. Together with the signal output of D23, the signal output of $\bar{I}33$ is applied to an adder circuit A33 whose signal output is connected to a signal input of a delay circuit D33.

In a corresponding manner, an iteration section ISi (i=4 through 9) incorporates inverter circuits Ii2 and inverter circuits $\bar{I}i1$, $\bar{I}i3$ which are complementary thereto, in combination with adder circuits Ai2, Ai1 and Ai3 as well as a sign detector SD(i–1) and shift registers SHi1 and SHi2. A division by a factor of $2^{-(i-2)}$ is obtained with the shift registers SHi1 and SHi2. The adder circuits Ai1, Ai2 and Ai3 are coupled to signal inputs of delay circuits Di1, Di2 and Di3, respectively. A signal input of the complementary inverter circuit $\bar{I}i3$ is connected to a fixed binary value corresponding to an angle value $\phi_i$.

The last iteration section IS1o only performs computations with reference to the angle value Zo obtained in the penultimate section IS9, which value coincides with zero within a deviation determined by the least significant bit in the angle value word. In the last iteration section IS10, no further angle convergence of Z9 is performed so that the circuits corresponding to $\bar{I}i3$ and Ai3, as well as the delay circuits corresponding to Di1, Di2 and Di3 are dispensed with.

The embodiment shown in FIG. 1 has a so-called pipeline structure because use is made of delay circuits Di1, Di2 and Di3 (i=1 . . . 9). This provides the possibility of performing the consecutive iterations at a clock frequency which is equal to the first sampling frequency. However, it is possible to dispense with the delay circuits Di1, Di2 and Di3. A serial iterative angle convergence in a sampling frequency which is smaller than the clock frequency by a factor equal to the number of iteration sections is then obtained.

Figure 2:
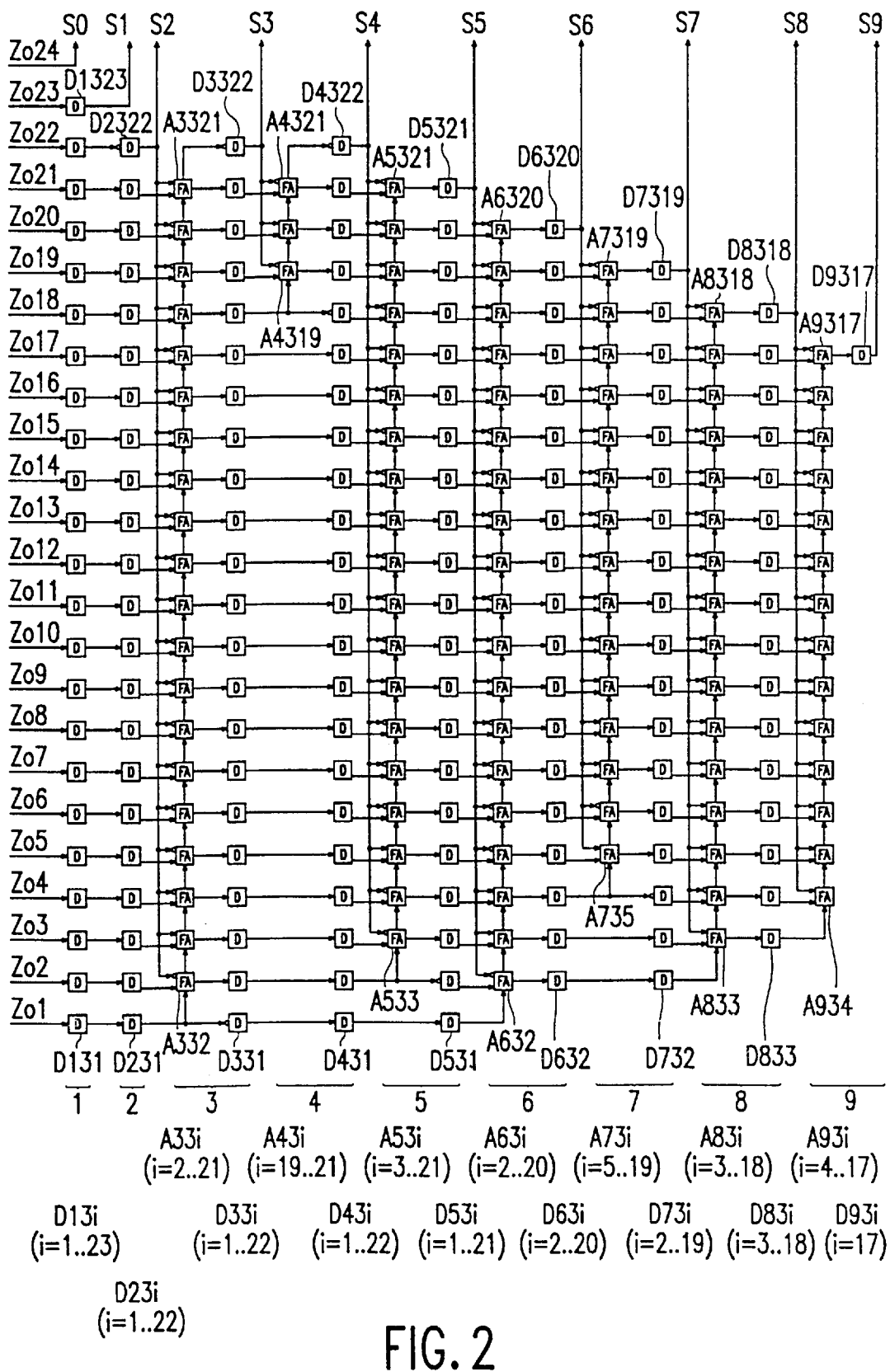
FIG. 2 shows an embodiment of a phase angle control circuit of the signal processor in the circuit of FIG. 1.

FIG. 2 shows a practical implementation of the phase angle control circuit, comprising the z branches in the cascade circuits of the first to tenth iteration sections IS1 to IS10.

In the case of a two's complement angle value representation as indicated in Table 1, the sign bit S0 for the iteration section IS1 is obtained at the MSB position (=bit Zo24) of the input angle value Zo, comprising bits Zoi (i=1 . . . 24), applied at phase input 18. The sign bit S1 for the iteration section IS2 is obtained by inverting bit Zo23 of the input angle value Zo and delaying it over one sampling period in the delay circuit D1311. Also the sign bit S2 for the third iteration section IS3 is solely determined by bit Zo22 of the input angle value Zo. Bits Zo1 . . . Zo23 are applied to signal inputs of delay circuits D131 . . . D1323.

Signal outputs of the delay circuits D131. to D1322 are connected to signal inputs of delay circuits D231 to D2321, respectively. A signal inversion is effected in the signal path of bit Zo22 of Zo and the delay circuit D2322 supplies the sign bit S2 to the third iteration section IS3. Outputs of the delay circuits D232 to D2321 are connected to first signal inputs of adder circuits A332 to A3321, respectively. The sign bit S2 is applied to second signal inputs of the adder circuits A333, A3311, A3314 . . . A3316, A3318 and A3321, while the inverted value of the sign bit S2 is applied to the other adder circuits. The adder circuits A332 to A3321 are interconnected through a carry-bit coupling, while a carry-bit input of the adder circuit A332 is coupled to the output of delay circuit D231. The carry-bit output signal of the adder circuit A3321 is applied as sign bit S3 to the fourth iteration section IS4 after inversion and delay in a delay circuit D3322. Signal outputs of the adder circuits A332 to A3321 are coupled to signal inputs of delay circuits D332 to D3321, respectively. A signal output of the delay circuit D231 is inverted and coupled to a signal input of delay circuit D331.

For the formation of the fourth sign bit S4, use is made of adder circuits A4319 to A4321, first signal inputs of which are coupled to signal outputs of delay circuits D3319 to D3321, while a second signal input of the adder circuit A4320 receives the sign bit S3 and second signal inputs of the adder circuits A4319 and A4321 receive the inverse value of the sign bit S3. The adder circuits A4319 to A4321 are interconnected via a carry-bit coupling, while a carry-bit input of the adder circuit A4319 is connected to an output of the delay circuit D3318. The carry-bit output signal of the adder circuit A4321 is applied as sign bit S4 to the fifth iteration section IS5 after inversion and delay in a delay circuit D4322. Signal outputs of the delay circuits D331 to D3318 and of the adder circuits A4319 to A4321 are coupled to delay circuits D431 to D4321, respectively, wherein the input signal of delay circuit D4318 is inverted.

The sign bit S5 for the sixth iteration section IS6 is obtained by means of adder circuits A533 to A5321, first inputs of which are coupled to delay circuits D433 to D4321, respectively. The sign bit S4 is applied to second signal inputs of adder circuits A535, A539, A5313, A5317 and A5319, while the inverse value of the sign bit S4 is applied to the other adder circuits of said group of nineteen adder circuits A533 to A5321. The adder circuits A533 to A5321 are interconnected via a carry-bit coupling. The carry-bit input of the adder circuit A533 is connected to an output of the delay circuit D432. Signal outputs of the delay circuits D431, D432 and the adder circuits A533 to A5321 are coupled to delay circuits D531 to D5321, respectively, wherein the input signal of delay circuit D532 is inverted. An output of the delay circuit D5321 supplies the sign bit S5 for the sixth iteration section IS6.

For forming the sign bit S6 for the seventh iteration section IS7, use is made of adder circuits A632 to A6320, first signal inputs of which are coupled to delay circuits D532 to D5320, respectively, while second signal inputs of the adder circuits A633, A634, A639, A6310, A6312, A6316 and A6318 receive the sign bit S5. The inverse value of the sign bit S5 is applied to second signal inputs of the other adder circuits. Also these adder circuits A632 to A6320 are interconnected via a carry-bit coupling, while a carry-bit input of the adder circuit A632 receives the output signal of the delay circuit D531. Signal outputs of the adder circuits A632 to A6320 are connected to delay circuits D632 to D6320, respectively. The output signal of the delay circuit D6320 is applied as sign bit S6 to the seventh iteration section IS7.

For forming the sign bit S7 for the eighth iteration section IS8, use is made of adder circuits A735 to A7319, first inputs of which are coupled to outputs of the delay circuits D635 to D6319, while second signal inputs of the adder circuits A735, A737 . . . A739, A7311, A7315 and A7317 receive the sign bit S6. The inverse value of the sign bit S6 is applied to second signal inputs of the other adder circuits. The adder circuits A735 to A7319 are interconnected via a carry-bit coupling. The delay circuit D634 is coupled to a carry-bit input of the adder circuit A735. Signal outputs of the delay circuits D632 to D634 and adder circuits A735 to A7319 are coupled to delay circuits D732 to D7319, respectively, wherein the input signal of delay circuit D734 is inverted. The sign bit S7 is obtained at the output of the delay circuit D7319.

For forming the sign bit S8 for the ninth iteration section IS9, use is made of adder circuits A833 to A8318. First signal inputs of the adder circuits A833 to A8318 are coupled to delay circuits D733 to D7318, respectively. Second signal inputs of the adder circuit A833, A835 . . . A838, A8310, A8314 and A8316 receive the sign bit S7, while second signal inputs of the other adder circuits receive the inverse value of the sign bit S7. The adder circuits A833 to A8318 are interconnected via a carry-bit coupling, while a carry-bit input of the adder circuit A833 is coupled to an output of the delay circuit D732. The adder circuits A833 to A8318 are connected to delay circuits D833 to D8318, respectively. The delay circuit D8318 supplies said sign bit S8.

For forming the sign bit S9 for the tenth iteration section IS10, use is made of adder circuits A934 to A9317, first signal inputs of which are coupled to outputs of the delay circuits D834 to D8317, respectively. Second signal inputs of the adder circuits A934 . . . A937, A939, A9313 and A9315 receive the sign bit S8, while second signal inputs of the other adder circuits receive the inverse value of the sign bit S8. The sign bit S9 for the iteration section IS10 is subsequently derived from the output signal of the adder circuit A9317 via a delay circuit D9317. The adder circuits A934 to A9317 are interconnected via a carry-bit coupling, while a carry-bit input of the adder circuit A934 is coupled to an output of the delay circuit D833.

The circuit shown in FIG. 2 and described hereinbefore appears to comprise a minimum number of circuit components with which the function of phase angle control circuit, comprising the z branches, required for generating the sign bits S0 to S9, are realized. This is possible by choosing the $\phi_i$ values in the iteration sections IS1 to IS10 in accordance with the Table 1 above. As already stated hereinbefore, the angle value Zo supplied to phase input 18 is iteratively rotated to a residual or zero value. For each iteration section, the variation range of Zi decreases. Thus, it is not necessary to pass on all bit values at the side of the most significant bit from the output to a subsequent iteration section. As a result, the word width of the angle value z in which variations may occur decreases for each iteration section. This yields a first economy of circuit components. Optimum use is further made of so-called wiring logic techniques, or realizing logic functions by means of suitably chosen through-connections.

In the phase angle control circuit of FIG. 2, sign bit S9 is calculated with an accuracy equal to the accuracy of sign bit S8, as both $\phi_9$ and $\phi_8$ are represented with the same number of least significant bits. This is not necessary, as a contribution of an error in $\phi_9$ to a total error of the calculation of Zout is proportional to the magnitude of $\phi_9$. This means that an error in $\phi_8$ contributes $\phi_8/\phi_9$ times as much to the total error, in comparison with $\phi_9$. As $\phi_8$ is approximately twice as large as $\phi_9$, an error in $\phi_8$ will contribute twice as much as an error in $\phi_9$. Thus, in accordance with the present invention, $\phi_9$ may be represented with an accuracy, which is $\phi_8/\phi_9$ times smaller than the accuracy of $\phi_8$, or, its representation may be 1 least significant bit less than the representation of $\phi_8$. As $\phi_7$ is approximately twice as large as $\phi_8$, $\phi_8$ may have a representation of 1 bit less than $\phi_7$, etc. This leads to $\phi_9$ having the smallest number of bits and $\phi_1$ having the largest number of bits. Now, the accuracy of the representation of $\phi_9$ can be chosen at will, for example, 0.5 or 0.25 its own value. In the example given in Table 1, $\phi_9$ is represented with only a single bit, which has proven to be accurate enough for practical purposes. However, this choice is arbitrary and other representation lengths for $\phi_9$ are also possible. For the representation of the phase angles as given in Table 1, this means that the 0's and 1's in italic can be deleted. The underlined zeros indicate that in the phase angle control circuit, the full adder at that position can be replaced by a wire. According to the invention, the accuracy of the representation of a phase angle is dependent on its magnitude. However, the maximum accuracy is of course limited by the maximum word length, which is determined, in practice, by the word length of the input phase. Furthermore, the accuracy depends also on the number of phase angles. In the example given, $\phi_9$ is represented by only 1 bit, but if $\phi_9$ were not the smallest angle (but $\phi_{10}$, for example), then $\phi_9$ would be represented by 2 bits. This means that the number of iteration steps also influences the accuracy of the representation, but: for a given number of iteration steps, the accuracy of the phase angles is dependent on the magnitude of the respective phase angle.

For the phase angle control circuit in FIG. 2, this means the following.

For forming the sign bit S9, the adders A934 . . . A9314 can be deleted and delay circuit D8314 is now coupled to the carry-bit input of adder A9315.

In a similar way, adders A833 . . . A8313 and delay circuits D833 . . . D8313 can be deleted. The carry-in input of adder A8314 is coupled to the output of delay circuit D7313.

For forming the sign bit S7, adders A735 . . . A7312 and delay circuits D735 . . . D7312 can be deleted. As in the binary representation the remaining LSBs are equal to zero, adders A7314 and A7315 can be replaced by wires, thereby directly coupling the outputs of delay circuits D6313 and D6314 to the inputs of delay circuits D7313 and D7314. Now, the carry-in input of adder A7315 is coupled to the output of delay circuit D5314 and the input of delay circuit D7314 is inverted.

For forming sign bit S6, adders A632 . . . A6311 and delay circuits D632 . . . D6311 are deleted. Now, the output of adder A6312 is not connected, and delay circuit D6312 is deleted as well.

For forming sign bit S5, adders A533 . . . A5310 and delay circuits D531 . . . D5310 are deleted. Furthermore, adder circuits A5311 and A5312 can be replaced by wires, directly coupling the outputs of delay circuits D4312 and D4313 to the inputs of delay circuits D5312 and D5313. However, the input signal of delay circuit D5312 is inverted. The carry-in input of adder A5313 is now coupled to the output of delay circuit D4312.

For forming sign bit S4, delay circuits D431 . . . D4310 can be deleted.

For forming sign bit S3, delay circuits D331 . . . D3310 and adders A332 . . . A3310 are deleted. Now the carry-in input of adder A3311 is coupled to the output of delay circuit D2310.

For forming sign bit S0 . . . S2, delay circuits D131 . . . D139 and D231 . . . D239 are deleted.

Figure 3:
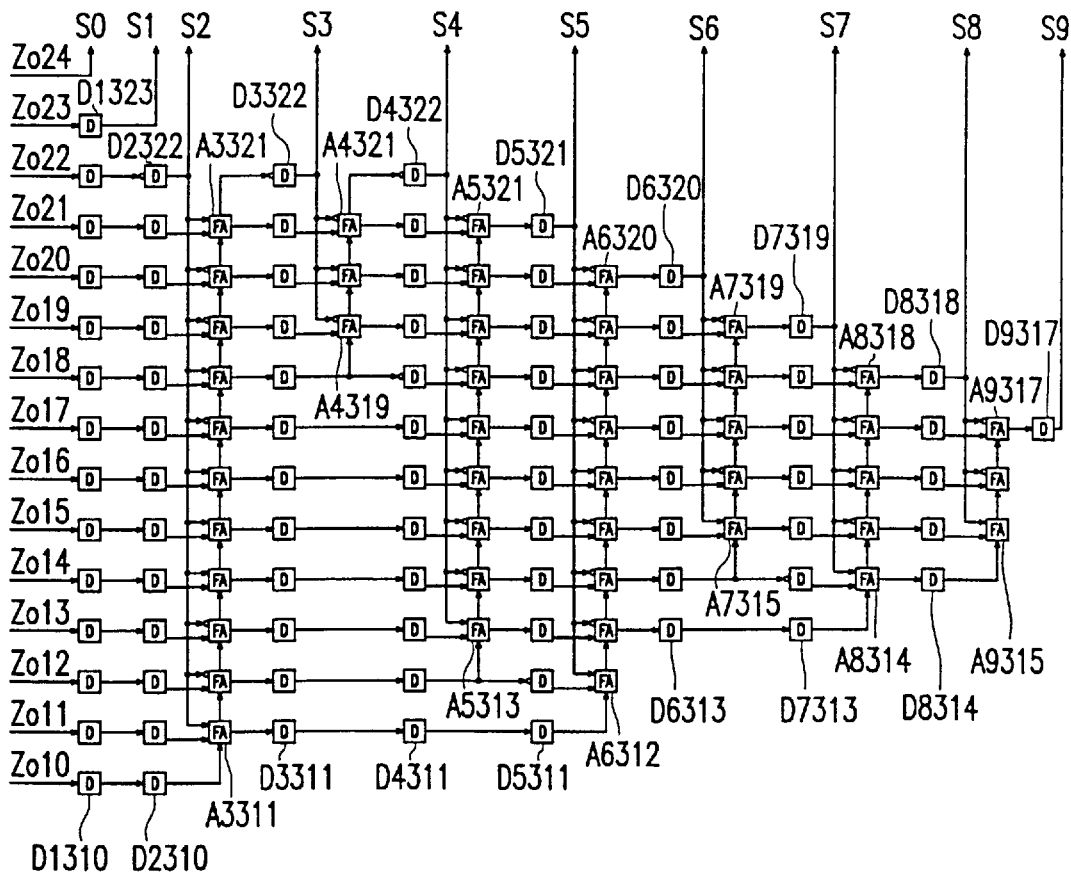
FIG. 3 shows an embodiment of the phase angle control circuit of the signal processor according to the invention.

This leads to the phase angle control circuit of FIG. 3, showing a circuit having only 45 instead of 106 full adders, as in FIG. 2. Through application of the measure according to the invention, a significant reduction of the number of full adders is obtained, resulting in a less complex signal processor, which requires less chip area.

A further reduction of the complexity is achieved by a suitable rounding of a binary representation. In Table 1, this is done for $\phi_4$. $\phi_4$ is now represented by the binary number 000010100000000, which normally would have been 000010011111101. By rounding the last-mentioned number, a significant number of full adders can be deleted as the superfluous zeros at the end of this representation result in the deletion of said full adders.

Figure 4:
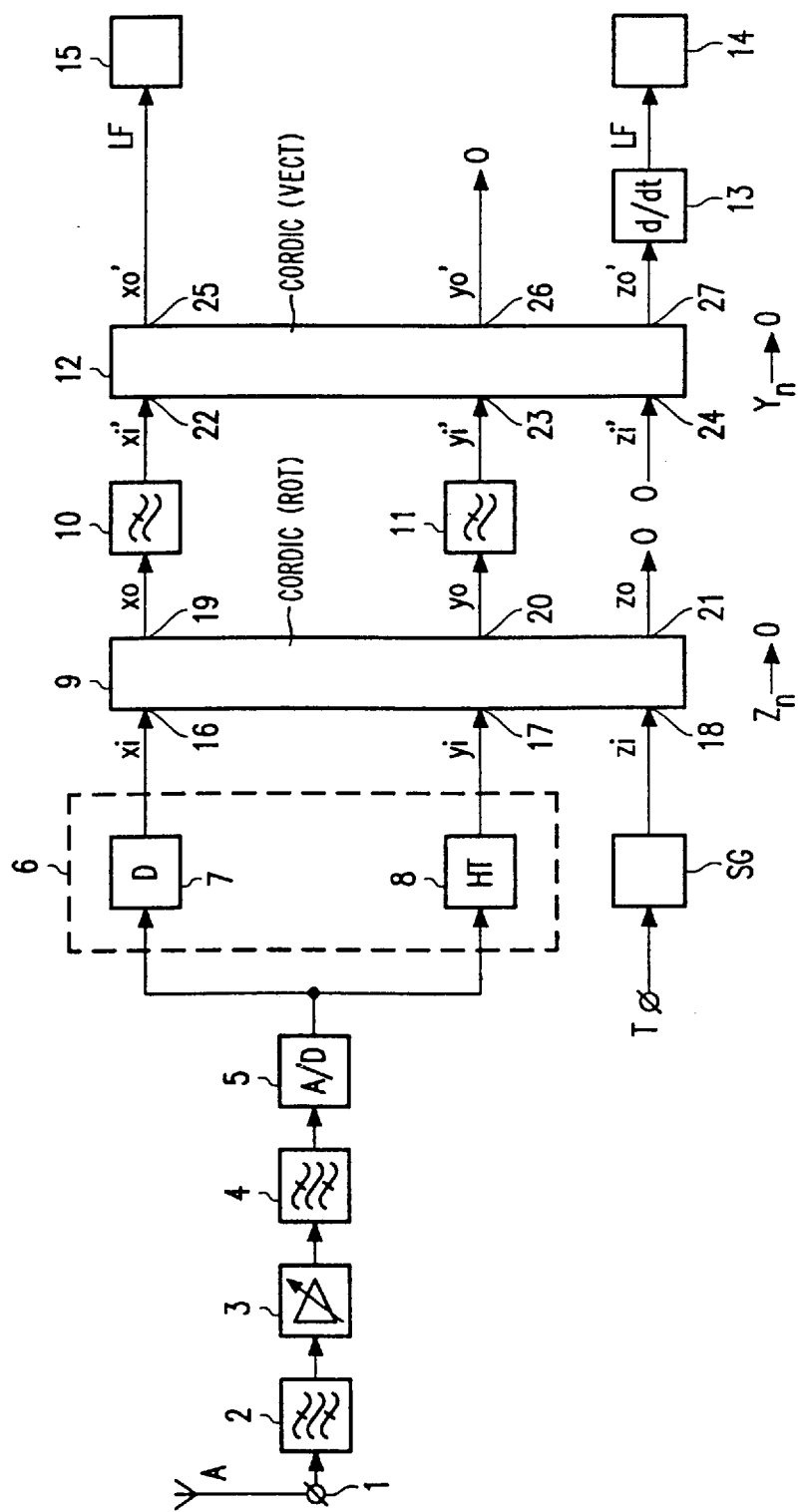
FIG. 4 shows an embodiment of a receiver according to the invention. In the figures, identical parts are provided with the same reference numbers.

FIG. 4 shows an embodiment of a receiver according to the invention. The receiver is of the direct conversion type, with an antenna input 1 for connecting a radio frequency (RF) antenna device A thereto to which there are consecutively coupled: a first RF input filter 2, a gain-controlled RF amplifier device 3, a second RF input filter 4, an A/D converter 5, a digital RF filter 6 for converting the RF signals digitized in the A/D converter 5 into digital in-phase (I) and quadrature (Q) RF signals, a first signal processor or coordinate digital computer (Cordic) 9 in the rotation mode having first and second signal inputs 16 and 17 and a phase signal input 18, first and second signal outputs 19 and 20, and a phase signal output 21, a digital baseband quadrature filter devices 10, 11, a second Cordic 12 in the vectoring mode having first and second signal inputs 22 and 23 and a phase signal input 24, and first and second signal outputs 25 and 26 and a phase signal output 27. The receiver shown is an FM receiver and to this end it comprises a signal differentiating circuit 13 which is coupled to the phase signal output 27 of the second Cordic, which signal differentiating circuit 13 is connected to a signal processing device 14 for further baseband processing and reproduction. At output 25 an AM demodulated signal can be obtained, which can be further processed in a baseband signal processing and reproduction device 15. Such a receiver is known from document EP 0 486 095 A1, corresponding to U.S. Pat. No. 5,230,011, and for more details about the receiver, reference is made to said document. In the receiver, an advantageous use of the present invention can be made by using a signal processor according to the invention for the signal processor (or Cordic) 9. As the signal processor according to the invention is less complex than the known signal processor, a receiver can be realized having less complexity than the known receiver.

We claim:

1. A signal processor comprising an X-Y rotation circuit for rotating, consecutively, an input vector over a series of, in magnitude, decreasing phase angles into an output vector, said X-Y rotation circuit comprising first and second inputs for receiving the input vector, and first and second outputs for supplying the output vector, and a phase angle control circuit for decomposing an input phase into said series of, in magnitude, decreasing phase angles, said phase angle control circuit comprising a phase input for receiving an input phase angle, characterized in that said phase angle control circuit comprises a series of stages, corresponding, respectively, to said series of decreasing phase angles, for iteratively rotating said input phase angle to a residual value; and means for reducing an accuracy of said rotated phase angle at each of said iterative stages in dependence on the magnitude of the rotated phase angle at said iterative stage.

2. The signal processor of claim 1, characterized in that said reducing means reduces the accuracy of each of said rotated phase angles substantially proportional to the magnitude of said rotated phase angle.

3. A receiver comprising:

an A/D converter for digitally sampling an analog signal modulated on a carrier frequency at a first sampling frequency;

a digital quadrature mixer stage coupled to an output of said A/D converter for performing a carrier frequency shift of the digitized modulated signal from the A/D converter, said digital quadrature mixer stage having first and second signal outputs for supplying a pair of carrier frequency converted phase quadrature signals;

a digital filter device for filtering the phase quadrature signals of the quadrature mixer stage and for decimating the sampling frequency from said first sampling frequency to a second sampling frequency; and a digital demodulation device, wherein the digital mixer stage comprising a signal processor, and wherein the signal processor comprises an X-Y rotation circuit for rotating, consecutively, an input vector over a series of, in magnitude, decreasing phase angles into an output vector, said X-Y rotation circuit comprising first and second inputs for receiving the input vector, and first and second outputs for supplying the output vector, and a phase angle control circuit for decomposing an input phase into said series of, in magnitude, decreasing phase angles, said phase angle control circuit comprising a phase input for receiving an input phase angle, characterized in that said phase angle control circuit comprises a series of stages, corresponding, respectively, to said series of decreasing phase angles, for iteratively rotating said input phase angle to a residual value; and means for reducing an accuracy of said rotated phase angle at each of said iterative stages in dependence on the magnitude of the rotated phase angle at said iterative stage.

4. The receiver of claim 3, characterized in that said reducing means reduces the accuracy of each of said rotated phase angles substantially proportional to the magnitude of said rotated phase angle.

* * * * *